June 19, 1945.　　　L. J. WESLEY　　　2,378,609
LOCK NUT AND BLANK THEREFOR
Original Filed April 6, 1943
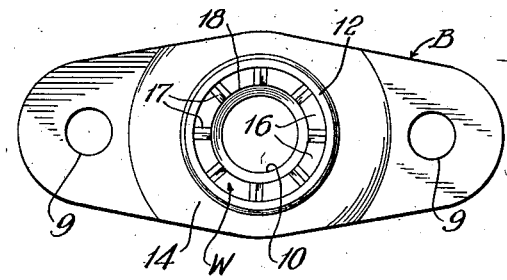
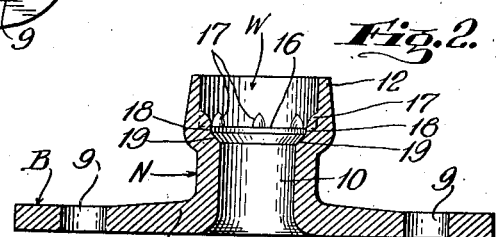
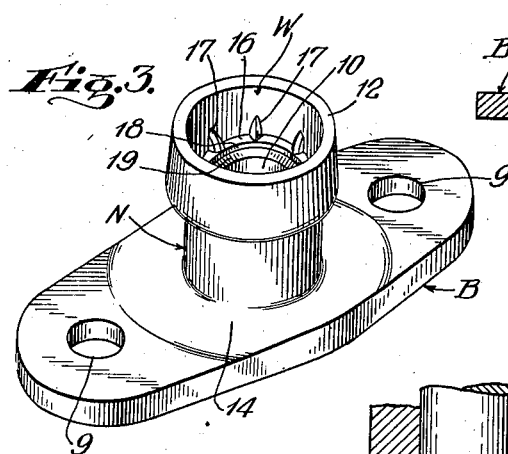
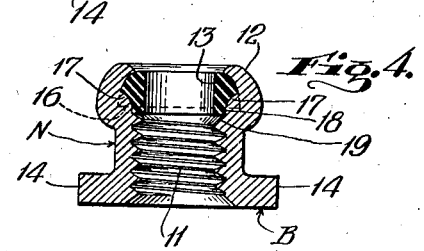
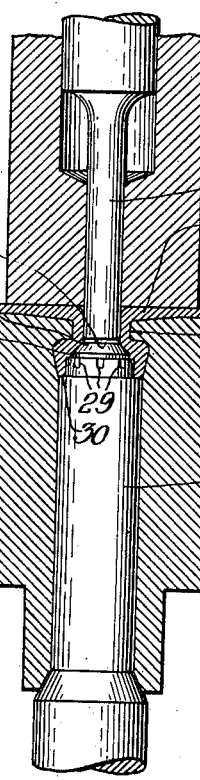
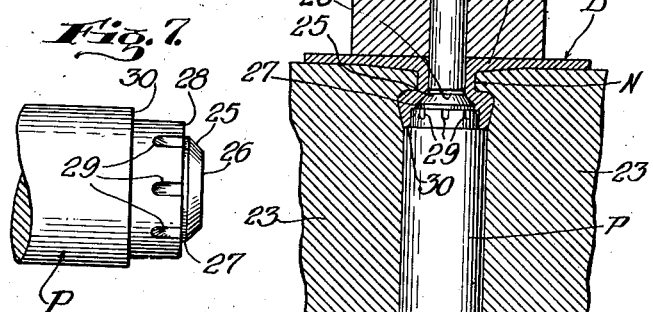
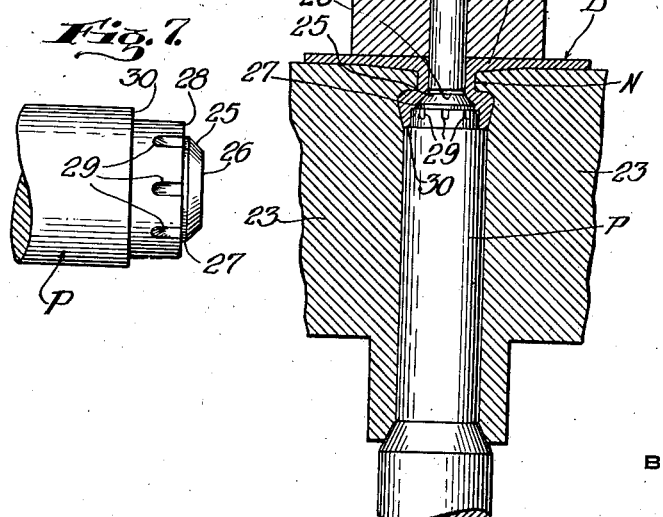
INVENTOR
LEO J. WESLEY
BY
his ATTORNEY Patented June 19, 1945

2,378,609

UNITED STATES PATENT OFFICE 2,378,609

LOCK NUT AND BLANK THEREFOR

Leo J. Wesley, Roselle Park, N. J., assignor to Electric Stop Nut Corporation of America, a corporation of New Jersey Original application April 6, 1943, Serial No. 481,966. Divided and this application November 17, 1944, Serial No. 563,841

3 Claims. (Cl. 10—86)

This application is a division of my copending application Serial No. 481,966, filed April 6, 1943.

This invention relates to nuts or the like, and particularly to anchor nuts of a type used extensively in aircraft and the like, wherein high strength and light weight are factors of great importance. This invention particularly relates to self-locking nuts, such as the type provided with a locking insert or washer in accordance with U. S. Patents 1,550,282 and 1,729,013. The insert or washer, preferably formed of fiber or the like, locks the nut and bolt or screw securely against loosening through vibration. It is generally accepted that the fiber keeps the nut and bolt threads seated against each other on the load sides, so that the coefficient of friction between the threads on the engaged load sides prevents relative rotation of the nut and bolt.

Anchor nuts are particularly useful in "blind" mounting, i. e. where the nut is inaccessible during attachment of the parts to be held together, and thus must be attached to one of the parts prior to attachment to the other part. For this purpose, anchor nuts are provided with a base having one or more laterally extending lugs, which lugs may be provided with rivet holes for attachment of the anchor nut.

Specifications for anchor nuts utilized in aircraft call for a tensile strength, determined by a pull test, above a specified minimum. The weight, of course, should be as low as possible, since a nut or fastening having a weight much less than other nuts—and which still meets the strength requirements—has a tremendously increased value, as saving in weight is translated directly into load carrying capacity of the plane. In the copending application of Veyne V. Mason, Serial No. 480,140, filed March 23, 1943, there is disclosed and claimed an anchor nut and blank in which the base has an increased thickness over that portion adjacent the neck. The nut and blank, and method, of this invention are in part improvements over the disclosure and/or claimed subject matter of the above Veyne V. Mason application.

Among the objects of this invention are to provide an improved nut or fastening, and blank therefor, of the character described; to provide such a nut or fastening, and blank therefor, which may be formed of sheet metal or the like; to provide a method of making such a nut or fastening, and blank therefor; to provide an improved nut or fastening having a locking insert or washer formed of fiber or the like, in which the washer or fiber is effectively prevented from turning; to provide an improved anchor nut of the character described; to provide such a nut in which the insert or washer may be clamped in position without damaging adjacent threads; to provide a method of making a nut or fastening having a locking insert or washer, whereby tool life may be prolonged; to provide an improved method of making an anchor nut of sheet metal or the like, as by a series of stamping operations.

Other objects and novel features of this invention will become apparent from the following description and accompanying drawing, in which:

Fig. 1 is a top view of an anchor nut blank constructed in accordance with this invention, prior to tapping and placement of a locking washer in a well adapted to receive the same;

Fig. 2 is a longitudinal section of the nut blank of Fig. 1;

Fig. 3 is a perspective view of the nut blank of Fig. 1;

Fig. 4 is a cross-section of a nut constructed in accordance with this invention, after the blank of Figs. 1 to 3 has been tapped and the locking washer assembled therein;

Fig. 5 is a cross-section of a portion of apparatus useful in making a nut in accordance with this invention; and Figs. 6 and 7 are top and partial side views, respectively, of a punch utilized in the apparatus of Fig. 5.

As in Figs. 1 to 3, the nut blank comprises a base B provided with rivet holes 9; a cylindrical neck N extending laterally from the base B and having a bore 10 adapted to be tapped to form threads 11 of Fig. 4; and a locking insert or washer receiving well W, having sides 12 adapted to be closed over onto a washer 13, as in Fig. 4. The nut blank is preferably made of sheet metal or the like, by a series of stamping operations. In one series of operations, a circular blank is punched from sheet metal stock. The neck N and washer well W are formed by first producing a central shallow bulge of relatively large diameter, then decreasing the diameter of the bulge and increasing its depth, in successive steps, until a relatively long cylindrical protuberance is produced. The end of the protuberance is then punched out, after which the sides are flared, in successive steps, to produce the washer well. The rivet holes are then pierced and the waste metal trimmed from the base. It will be understood, of course, that the blank may be made in other ways or by a different series of steps.

In accordance with the above referred to Veyne

V. Mason application, Serial No. 480,140, the base B is substantially thicker adjacent neck N, as at section 14, than at points removed therefrom; also, section 14 of base B may be thicker than any other section of the nut. Section 14 preferably has a thickness sufficient to produce a tensile strength, on pull test, above a predetermined minimum, and the remainder of the nut is sufficiently thinner than section 14 to reduce the weight. Section 14 need be thickened only a relatively small amount to increase considerably the tensile strength of the nut, on pull test, as it has been discovered that thickening the base adjacent the neck increases the tensile strength of the nut, on pull test, to a degree far out of proportion to the additional amount of metal provided in the thickened portion.

In accordance with this invention, the washer well W is provided with a seat 16 and a plurality of projections 17, which projections are adapted to bite or sink into the washer and prevent the same from turning. The projections may be formed in a manner described later in connection with Figs. 5 to 7, inclusive, but it is sufficient here to state that the number of projections is maintained above a predetermined minimum which reduces the amount of material between each pair of projections sufficiently to reduce tool breakage in forming the projections. As shown, there are eight projections, but it will be understood that the number may be varied.

As is evident from Fig. 4, the sides of the washer well, when crimped over onto the washer, are bent inwardly to exert lateral pressure against the washer, as disclosed and claimed in U. S. Patent No. 2,153,681.

In further accordance with this invention, a cylindrical lip 18 and a bevel 19 are provided between bore 10 of neck N and seat 16 of the washer well. The extent of bevel 19 need not be great, since a considerable portion thereof is cut away or forms part of the top thread. Lip 18 and bevel 19 cooperate to substantially effectively prevent the washer from smashing down the top screw thread. It is desirable that the threads extend as close as possible to the washer well, to provide the greatest amount of thread strength, but when the threads extend relatively close to the seat, without the bevel or lip, the top thread tends to be smashed down by the washer during the closing operation. A smashed thread will strip the plating from a bolt or screw thus increasing the danger of corrosion. Obviously, screws and bolts utilized to hold essential parts of planes together cannot be stripped of protective plating with impunity.

Lip 18 is not only particularly effective in conjunction with bevel 19 for the above purpose, but the lip also reduces the amount of metal to be displaced when the projections are formed, thus further assisting in reducing tool breakage.

As stated previously, the nut blank may be made from sheet metal or the like, by a series of stamping operations, in which a circular blank is first provided with a centrally disposed, relatively long, cylindrical projection, and the open end of the projection is then flared to produce the washer well. In one form of machine, the blank is moved from station to station by a series of horizontally movable fingers which grip the blank on each side, there being a pair of fingers for transferring the blank from each station to the next. At each station, the blank is pushed out of the fingers into a die below by a vertically moving punch and, after punching, the blank is returned to the fingers by a knockout pin coming up through the die from beneath.

In accordance with this invention, the projections 17 may be produced by an improved swaging or punching operation, while the washer well is being flared, such as by the punch and die arrangement shown in Fig. 5. In this arrangement an upper punch 21, having a pilot 22 adapted to enter the bore of the blank and center the same, pushes the blank out of the conveying fingers (not shown), and against the upper surface of spring-supported jaws 23, which at that time are open to admit the washer well projection. As the jaws are pushed downwardly by punch 21, they are moved inwardly by tapered camming surfaces to close and grip the blank about the neck N, thereby to provide support for both the projection forming operation and shaping of the washer well. Then, a punch P is pushed upwardly to form seat 16, projections 17, rim 18, and bevel 19 of the nut blank and shape the side walls of the washer well against the jaws. During this time, the fingers are moving back for another blank, and after the forming operation is concluded, upper punch 21 and pilot 22 are withdrawn, to permit the jaws to rise and separate, while punch P is moved further upwardly to push the blank back up into the relaying fingers. As punch P is lowered, to be ready for the next blank, the fingers are moving the blank to the subsequent station, while the previous set of fingers is moving up the next blank.

Punch P may be specially constructed to carry out the method of this invention, and, for this purpose, as in Figs. 6 and 7, is provided with a frusto-conical apex 25, having a flat 26 at the top. Surrounding apex 25 are a cylindrical lip 27 and an annular rim 28, while a plurality of equally spaced slots 29 are disposed about the rim. Slots 29 preferably are formed by a milling cutter which produces a semi-circular bottom as shown in Figs. 6 and 7, though the slots may be formed instead by a broaching or forging operation to produce an angular bottom and projections of the form shown in Figs. 1-3. It will be evident that apex 25 produces bevel 19, while lip 27 and rim 28 form lip 18 and seat 16, respectively, the metal flowing into slots 29 to form projections 17 of the nut blank of Figs. 1-3. In addition, the punch is provided with a shoulder 30 adapted to establish the height of the side walls 12 of the washer well. For easier withdrawal, the punch tapers slightly between rim 28 and shoulder 30, as shown.

Ordinarily, considerable difficulty with tool breakage is experienced due to the sharp corners of rim 28 on each side of a slot 29 breaking off. However, by this invention, such tendency for tool breakage is greatly minimized since the distance and amount of metal forced to flow in producing seat 16 and projections 17 is decreased sufficiently to reduce the localized stresses on the corners of the slots to a safe working stress. This is accomplished by increasing the number of equally spaced projections to reduce the distance metal is forced to flow laterally into slots 29 and by the provision of lip 18, into which flows metal displaced in forming seat 16. As shown, there are eight slots 29, to correspond with the number of projections in the nut blank, but this number may be varied as desired, in accordance with the ease of punching and tendency for tool breakage, determined by the size and particularly the material of which the blank and tool are formed, and condition thereof. Also the relative sizes of the seat 16 and lip 18, as well as the amount of material in projections 17 are factors to be considered. As an example, but not in limitation of this invention, eight projections are used in a blank wherein the washer well has a diameter of slightly over 17/64 inch, and a height of slightly over 3/32 inch, the bore having a diameter of slightly over 3/32 inch and the nut blank having an overall height of slightly under 1/8 inch.

The specific form of punch P need not be followed, inasmuch as it may be found desirable to provide different sizes and/or configurations for the projections, as well as different sizes of and/or relationship of sizes between seat 16 and lip 18. Also, the form of slots 29 may vary widely, although, in general, as deep a slot as practicable is desirable, since a deeper slot produces a higher projection which will penetrate further into the washer and thus provide a greater resistance to turning.

Although this invention has been explained in connection with an anchor nut adapted to be utilized in fastening parts of an airplane or the like together, it will be understood that the principles thereof are applicable to many types of nuts, fittings, and other fastening elements, and that the configuration of the nut may vary considerably. It will also be understood that other and various changes may be made without departing from the spirit and scope of this invention, as defined in the appended claims.

What is claimed:

1. In the manufacture of nuts of the kind in which an insert receiving recess or well is formed in a blank having an open-ended neck formed by a tubular wall, that improvement which consists in supporting said neck in suitable external dies relieved to provide an annular space around the outer end portion of said neck, and forcing a suitaby tapered and shouldered punch axially into the open and unsupported end portion of said neck to expand the same against the relieved portion of said dies and thereby form a well having a diameter substantially greater than that of the bore of the supported portion of said neck, said well having an annular transverse seat formed from material displaced by said punch and flowing against said shoulder.

2. In the manufacture of nuts of the kind in which an insert receiving recess or well is formed in a blank having an open-ended neck formed by a tubular wall, that improvement which consists in supporting said neck in suitable external dies relieved to provide an annular space around the outer end portion of said neck, and forcing a punch having a tapered nose portion terminating in an annular shoulder axially into the unsupported end portion of said neck to expand the same against the relieved portion of said dies and thereby form a well having a diameter substantially greater than that of the bore of the supported portion of said neck, said well having an annular transverse seat and there being a tapered bore portion between said seat and the bore of the supported portion of said neck, said seat and said tapered portion being formed from material displaced by said punch and flowing against the tapered and shouldered portions thereof.

3. In the manufacture of nuts of the kind in which an insert receiving recess or well is formed in a blank having an open-ended neck formed by a tubular wall, that improvement which consists in supporting said neck in suitable external dies relieved to provide an annular space around the outer end portion of said neck, and forcing a suitably shouldered and grooved punch axially into the open end part of said neck to form a well having a transversely extending annular seat and inwardly extending projections at the periphery of said seat, said seat and said projections being formed by material displaced by said punch and flowing against said shoulder and into the grooves of said punch.

LEO J. WESLEY.